(12) United States Patent
Miyata et al.

(10) Patent No.: US 9,120,924 B2
(45) Date of Patent: Sep. 1, 2015

(54) AQUEOUS THERMOSETTING COMPOSITION

(75) Inventors: Gen Miyata, Ichihara (JP); Yoshitomo Saitou, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 1085 days.

(21) Appl. No.: 12/312,467

(22) PCT Filed: Nov. 13, 2007

(86) PCT No.: PCT/JP2007/071963
§ 371 (c)(1),
(2), (4) Date: May 12, 2009

(87) PCT Pub. No.: WO2008/059813
PCT Pub. Date: May 22, 2008

(65) Prior Publication Data
US 2010/0056701 A1    Mar. 4, 2010

(30) Foreign Application Priority Data
Nov. 17, 2006   (JP) ................. 2006-311589

(51) Int. Cl.
| C08L 75/04 | (2006.01) |
| C08L 59/00 | (2006.01) |
| C08G 18/08 | (2006.01) |
| C08G 18/66 | (2006.01) |
| C09D 175/04 | (2006.01) |
| C08G 18/32 | (2006.01) |

(52) U.S. Cl.
CPC ............ C08L 59/00 (2013.01); C08G 18/0823 (2013.01); C08G 18/6659 (2013.01); C08G 18/6692 (2013.01); C09D 175/04 (2013.01); C08G 18/32 (2013.01); C08G 18/3256 (2013.01); C08L 75/04 (2013.01)

(58) Field of Classification Search
CPC ..................... C08G 18/32; C08G 18/3256
USPC ......................................... 524/539
See application file for complete search history.

(56) References Cited

U.S. PATENT DOCUMENTS

| 5,272,010 | A | * | 12/1993 | Quinn ................. 428/411.1 |
| 5,368,944 | A | * | 11/1994 | Hartung et al. ......... 428/423.1 |
| 5,556,527 | A | * | 9/1996 | Igarashi et al. ............ 204/488 |
| 6,221,949 | B1 | | 4/2001 | Gross et al. |
| 7,163,979 | B2 | | 1/2007 | Okazaki et al. |
| 2002/0114955 | A1 | * | 8/2002 | Lamers et al. .......... 428/423.3 |
| 2003/0187125 | A1 | * | 10/2003 | Okazaki et al. ............ 524/500 |

FOREIGN PATENT DOCUMENTS

| CN | 1047684 | | 12/1990 |
| CN | 1162322 | | 10/1997 |
| JP | 4-198361 | A | 7/1992 |
| JP | 6-239949 | A | 8/1994 |
| JP | 6-329876 | A | 11/1994 |
| JP | 2004-2729 | A | 1/2004 |

OTHER PUBLICATIONS

Office Action in CN Appln No. 200780042018.6 dated Sep. 13, 2010.

* cited by examiner

*Primary Examiner* — Michael Pepitone
(74) *Attorney, Agent, or Firm* — Foley & Lardner LLP

(57) ABSTRACT

An aqueous thermosetting composition comprising an amino resin (A) obtained by addition dehydration condensation of an amino compound (a), an aldehyde (b) and an alcohol (c) and a urethane resin (B) obtained by polymerization of an isocyanate (d), a polyol (e) and an oxycarboxylic acid (f) having two or more hydroxyl groups. The aqueous thermosetting composition of the present invention contains both an amino resin and a urethane resin in a one-pack hardener, and the respective performances of the resins can be retained without any deterioration. Further, the aqueous thermosetting composition exhibits favorable dispersibility in water and excels in storage stability, so that it is useful in a wide spectrum of application fields, such as paint, ink, adhesive, coating material, binder and primer.

9 Claims, No Drawings

AQUEOUS THERMOSETTING COMPOSITION

TECHNICAL FIELD

The present invention relates to an aqueous thermosetting composition containing an amino resin (A) and a urethane resin (B).

BACKGROUND ART

As a thermosetting coating composition, resin compositions utilizing an aminoformaldehyde resin as a hardener (curing agent) are hitherto commonly known. In recent years, the research for changing to a paint or coating material dilutable with water for the purpose of reduction of an organic solvent emitted at the time of coating film drying from the viewpoint of air pollution and environmental protection is becoming active. Simultaneously, an aqueous thermosetting composition that is soluble in water and exhibits high performance is increasingly demanded.

Urethane resins due to the properties thereof of being excellent in mechanical properties, abrasion resistance to base material, flexibility, solvent resistance, etc. find wide applications in paints, inks, adhesives, coating agents, fiber treating agents, etc. On the other hand, amino resins due to the properties thereof of being excellent in appearance characteristic, antiweatherability, mechanical properties, etc. find applications in paints, inks, adhesives, coating agents, fiber treating agents, etc. Paints or coating materials taking advantage of these excellent properties of these amino resin and urethane resin realize surprisingly high performance. The amino resin and urethane resin have been applied through combining of the resins as separate two-pack hardeners.

In the event of mixing of the two-pack liquids into one-pack liquid, it is difficult to attain homogeneous stable storage thereof because of a difference in compatibilities between the amino resin and urethane resin. Accordingly, in conformity with individual usages, it has been necessary to add a third component, such as a stabilizer or a compatibilizer, to such one-pack liquid. However, as the third component tends to adversely affect the performance in each usage, it has been difficult to achieve the exertion of the respective inherent performances of the urethane resin and amino resin.

In efforts for solving this problem, there can be mentioned patent references (1) and (2) proposing the technology of an amino resin excelling in not only the hardenability but also the water resistance, alkali resistance, processability, hardness, etc. According to the description of these references, in the process of amino resin production, a urethane resin is used as a raw material of amino resin so that the urethane resin is incorporated in the structure as a part of the amino resin skeleton to thereby provide a hardener capable of water solubilization. However, in the examples of these references, as a hydrophilic group such as carboxylic acid or an amino group is introduced as an indispensable structure in the ends of the urethane resin skeleton, not only is the water resistance deteriorated but also the multinuclear structure being a characteristic of the amino resin is scattered by urethane structure segments, thereby causing the exertion of appearance feature, high hardness, etc. being the inherent characteristics of the amino resin to be difficult. Moreover, the use of the urethane resin is exclusively for the purpose of water solubilization, and the exertion of toughness, etc. of urethane resin having been regarded as being inherently superior has been unsatisfactory.

Patent reference (1): JP 6-329876 A
Patent reference (2): JP 6-239949 A.

DISCLOSURE OF THE INVENTION

Problems to be Solved by the Invention

It is an object of the present invention to provide an aqueous thermosetting composition consisting essentially of a urethane resin and an amino resin in which the amino resin and urethane resin of different compatibilities having been used as two-pack hardeners are used in the form of a one-pack hardener. It is another object of the present invention to provide an aqueous thermosetting composition that excels in coating film properties, adhesion and mechanical properties to thereby be suitable for a variety of paints, coating agents, adhesives, etc. and to provide a process for producing the same.

Means for Solving the Problems

The inventors have conducted extensive studies. As a result, it has been found that the above means can be provided by an aqueous thermosetting composition comprising an amino resin (A) obtained by addition dehydration condensation of an amino compound (a), an aldehyde (b) and an alcohol (c) and a urethane resin (B) obtained by polymerization of an isocyanate (d), a polyol (e) and an oxycarboxylic acid (f) having two or more hydroxyl groups.

The aqueous thermosetting composition preferably contains a polyol of at least 500 weight average molecular weight as the polyol (e).

The aqueous thermosetting composition may be one wherein the urethane resin (B) has, as its terminal functional groups, hydroxyl groups capable of reacting with an amino resin, at least one of which has reacted with the amino resin (A). Further, the aqueous thermosetting composition may be one wherein the amino resin (A) is formed into an alkyl ether by an alcohol (c) having 1 to 8 carbon atoms.

The aqueous thermosetting composition is produced by a process comprising reacting the amino resin (A) with the urethane resin (B). The process for producing the aqueous thermosetting composition may be one wherein an alcohol (C) of the type different from that of the alcohol (c) is used as a reaction solvent. Furthermore, the process for producing the aqueous thermosetting composition may be one wherein, after the reaction of the amino resin (A) with the urethane resin (B), neutralization is carried out with the use of an organic or inorganic basic compound (d).

Moreover, there are provided a paint, a coating agent and an adhesive each comprising the above aqueous thermosetting composition. Herein, the terminology "aqueous" means the "state of being dissolved in water completely or partially containing an undissolved matter."

Effects of the Invention

The aqueous thermosetting composition of the present invention contains both an amino resin and a urethane resin in a one-pack hardener, and the respective performances of the resins can be retained without any deterioration. Further, the aqueous thermosetting composition exhibits favorable dispersibility in water and excels in storage stability, so that it is useful in a wide spectrum of application fields, such as paint, ink, adhesive, coating material, binder and primer.

BEST MODE FOR CARRYING OUT THE INVENTION

Now, the present invention will be described in detail. The following description of the constituent elements concerns representative examples of embodiments of the present invention, the contents of which in no way limit the scope of the present invention.

[Amino Resin (A)]

The amino resin (A) for use in the present invention is obtained by addition dehydration condensation of an amino compound (a), an aldehyde (b) and an alcohol (c).

Amino Compound (a)

As the amino compound (a) for use in the present invention, there can be mentioned urea, melamine, benzoguanamine or any of other triazine compounds. Among the mentioned compounds, melamine is preferred from the viewpoint of realized properties.

Aldehyde (b)

As the aldehyde (b) for use in the present invention, there can be employed formaldehyde, acetoaldehyde, propionaldehyde, benzaldehyde or the like. Formaldehyde is preferred from the viewpoint of economic advantage.

Alcohol (c)

As the alcohol (c) for use in the present invention, there can be employed any of alcohols of the formula $C_nH_{2n+1}OH$ ($8 \geq n \geq 1$). The alcohol may be linear or branched. From the viewpoint of economic advantage and coating film performance, $4 \geq n \geq 1$ is preferred.

The common process for producing the amino resin (A) is as follows. As raw materials, the amino compound (a), aldehyde (b) and alcohol (c) are used in respective molar ratios of 1, 3 to 7 and 4 to 10. Dissolution is effected using the alcohol (c) as a reaction solvent. An acid is added as a catalyst so as to convert the alcohol (c) to an alkyl ether, thereby obtaining an amino resin. Unreacted alcohol (c) remaining in excess is partially removed by vacuum distillation operation so as to regulate the nonvolatile content to a given level. In that instance, when the boiling point at ordinary pressure of the alcohol (c) is 200° C. or higher, the heating required in the vacuum distillation operation would invite self-crosslinking of the amino resin (A). From this viewpoint, it is preferred that the number of carbon atoms of the alcohol (c) be 8 or less.

[Urethane Resin (B)]

The urethane resin (B) for use in the present invention is obtained as a copolymer of an isocyanate (d), a polyol (e) and an oxycarboxylic acid (f) having two or more hydroxyl groups.

Isocyanate (d)

As the isocyanate (d) for use in the present invention, there can be mentioned, for example, an aliphatic isocyanate such as 1,4-tetramethylene diisocyanate, 1,6-hexamethylene diisocyanate, 2,4,4-trimethylhexamethylene diisocyanate or 2,6-diisocyanatomethyl caproate, an alicyclic diisocyanate such as 3-isocyanatomethyl-3,5,5-trimethylcyclohexyl isocyanate, methylcyclohexyl-2,4-diisocyanate, isophorone diisocyanate or norbornene diisocyanate, an aromatic diisocyanate such as tolulene diisocyanate, diphenylmethane diisocyanate, 1,5-naphthene diisocyanate, diphenylmethyl-methane diisocyanate, tetraalkyldiphenylmethane diisocyanate, 4,4-dibenzyl diisocyanate or 1,3-phenylene diisocyanate, a chlorinated diisocyanate, or a brominated diisocyanate. Also, use can be made of a polyisocyanate compound being an adduct with water or the like or a mixture of two or more thereof.

Polyol (e)

As the polyol (e) for use in the present invention, there can be mentioned a mixture of two or three or more members selected from among publicly known polyols commonly employed in the production of urethane resin, such as diethylene glycol, butanediol, hexanediol, neopentyl glycol, bisphenol A, cyclohexanedimethanol, trimethylolpropane, glycerol, pentaerythritol, polyethylene glycol, polycarbonate polyol, cyclohexanedimethanol, polypropylene glycol, polyester polyol, polycaprolactone, polytetramethylene ether glycol, polythioether polyol, polyacetal polyol, polybutadiene polyol and furandimethanol. From the viewpoint of exertion of flexibility and toughness being the expected performance of urethane resin, it is preferred to use at least one polyol of 500 to 10,000 weight average molecular weight in terms of polystyrene. These polyols can be appropriately selected in conformity with the intended purpose or application field to thereby attain easily designing of required properties, such as hardness or softness.

Oxycarboxylic Acid (f) Having Two or More Hydroxyl Groups

The oxycarboxylic acid (f) having two or more hydroxyl groups for use in the present invention is not particularly limited as long as carboxylic acid can be incorporated in the form of a branch in each urethane resin molecule. From the viewpoint of increasing the content of carboxylic acid in the urethane resin, it is preferred to employ a low-molecular-weight one having 3 to 10 carbon atoms wherein at least one carboxyl group is had in the form of a branch, such as 2,2-dimethylolpropionic acid, 2,2-dimethylolbutanoic acid or the like.

The common process for producing the urethane resin (B) is as follows. A polyol (e) and an oxycarboxylic acid (f) having two or more hydroxyl groups are dissolved in an organic solvent, such as toluene, while heating. After the completion of the dissolution, the solution is cooled to 50° C. or below. Subsequently, while maintaining the temperature at 50° C. or below for the prevention of excessive temperature rise by reaction heat, the isocyanate (d) is dropped over a period of 2 to 3 hours, thereby obtaining a urethane resin. In this stage, a urethane resin (B) having a hydroxyl group in its terminal structure can be obtained by regulating the molar ratio of isocyanate group had by the isocyanate (d) to a value of 0.5 to 0.9 provided that the sum of the respective molar ratios of hydroxyl groups had by the polyol (e) and oxycarboxylic acid (f) having two or more hydroxyl groups is 1.

As the solvent employed in the production of urethane resin in the present invention, use can be made of any of organic solvents commonly employed in urethane resin production. For example, there can be mentioned methyl ethyl ketone, methyl isobutyl ketone, ethyl acetate, isopropyl alcohol, toluene, xylene, isobutyl acetate, butyl acetate, acetone, dimethylformamide, N-ethyl-2-pyrrolidone, diethylene glycol dimethyl ether or the like.

[Process for Producing Aqueous Thermosetting Composition]

In the process for producing an aqueous thermosetting composition according to the present invention, an isocyanate (d), a polyol (e) and an oxycarboxylic acid (f) having two or more hydroxyl groups are subjected to urethanizing reaction to thereby obtain a urethane resin (B) having hydroxyl groups at both ends of each polymer molecule thereof. The urethane resin is reacted with an amino resin (A) obtained by addition dehydration condensation of an amino compound (a), an aldehyde (b) and an alcohol (c). (The thus obtained resin is hereinafter referred to as composited resin (R).)

In the reaction of the urethane resin (B) with the amino resin (A) according to the present invention, the amount of amino resin (A) used is in the range of 30 to 97 parts by weight per 100 parts by weight of the sum of amino resin and urethane resin used in the reaction. When the amount of amino resin is less than 30 parts by weight, the amount of terminal hydroxyl groups of the urethane resin (B) not contributing to a hardening reaction with base resin would become excess to thereby bring about deterioration of water resistance. On the other hand, when the amount of amino resin is over 97 parts by weight, the amount of unreacted amino resin would become excess to thereby cause the water solubilization after the reaction to be difficult. Preferably, the amount of amino resin ranges from 50 to 85 parts by weight.

In the reaction of the urethane resin (B) with the amino resin (A) according to the present invention, on the other hand, the amount of urethane resin (B) used is in the range of 3 to 70 parts by weight per 100 parts by weight of the sum of amino resin and urethane resin used in the reaction. When the amount of urethane resin is less than 3 parts by weight, the expected flexibility would be low. On the other hand, when the amount of urethane resin exceeds 70 parts by weight, deteriorations of water resistance and coating film hardness would occur. Preferably, the amount of urethane resin ranges from 15 to 50 parts by weight.

Efficient reaction promotion can be achieved by the use of, as a reaction solvent for amino resin and urethane resin, an alcohol (C) that is different from the alcohol (c) being the raw material for alkyl ether contained in the amino resin (A).

As the alcohol (C) added as a reaction solvent at the stage of reaction between amino resin (A) and urethane resin (B) in the present invention, there can be mentioned, for example, a secondary or tertiary alcohol such as isopropyl alcohol, 2-butyl alcohol, tert-butanol, cyclobutanol, cyclopentanol, cyclohexanol, pinacol, cycloheptanol, 2-ethyl-1-hexanol or diacetone alcohol, or an alcohol with hydrophilicity different from that of the alcohol (c) employed in the production of amino resin. The amount of alcohol (C) used is in the range of 10 to 60 parts by weight per 100 parts by weight of the sum of amino resin and urethane resin used in the reaction. When the amount of alcohol (C) is less than 10 parts by weight, excess promotion of reaction would occur to thereby bring about a viscosity increase. On the other hand, when the amount is over 60 parts by weight, a high dilution ratio would suppress a progress of reaction. Preferably, the amount of alcohol (C) used is in the range of 20 to 40 parts by weight.

According to necessity, the composited resin (R) can be neutralized with a basic compound (d). As the basic compound (d), there can be mentioned any of inorganic basic compounds including an alkali metal hydroxide, such as sodium hydroxide or potassium hydroxide, and ammonia, or any of organic basic compounds including an alkanolamine, such as monoethanolamine, dimethylethanolamine or triethanolamine, and an amine, such as aminomorpholine.

EXAMPLE

Now, the present invention will be described in greater detail with reference to Examples and Comparative Examples, which Examples in no way limit the scope of the present invention.

Production Example 1

Amino Resin A-1

An example of amino resin production is as follows. A reactor equipped with a thermometer, a stirrer, a reflux condenser and a solvent by-product recovery device was charged with 196 parts of paraformaldehyde (containing 92% formaldehyde), 126 parts of melamine and 519 parts of n-butanol. While stirring, a 10% aqueous solution of phosphoric acid was added to the mixture so that the pH value of the reaction mixture liquid was adjusted to 5.0. The mixture was heated to reflux temperature to thereby attain dissolution. Thereafter, heating was made, and while maintaining the temperature of the reaction mixture liquid at 90° C., the reaction was carried on for 4 hours. Triethylamine was added thereto so that the pH value of the system interior was adjusted to 7.0. The reaction mixture liquid was cooled to 70° C., and in vacuum while maintaining the temperature of the system interior at 70° C. or below, excess n-butanol was removed outside the system so that the resin nonvolatile content became 70%. The thus obtained amino resin was a hydrophobic amino resin of high conversion to alkyl ether exhibiting an MS compatibility of 12 and a bubble viscosity of Z4.

Production Example 2

Amino Resin A-2

An amino resin was produced with the use of the same apparatus as in Production Example 1. The amounts and molar ratios of amino compound (a), aldehyde (b) and alcohol (c) were changed.

Amino Resin A-3

"Cymel 325" produced by Japan Cytec Industries Inc. being a melamine based amino resin was used a comparative example.

The resins A-1, A-2 and A-3 are summarized in the following Table 1.

TABLE 1

|   |   | A-1 | A-2 | A-3 |
|---|---|---|---|---|
| (a) | melamine | 126 | 126 | — |
| (b) | 92% paraformaldehyde | 196 | 163 | — |
| (c) | n-butyl alcohol | 519 | 445 | — |
|   | nonvolatile content (%) | 70 | 65 | 80 |
|   | MS compatibility | 12 | 6 | 1 |

Nonvolatile content: measured in accordance with JIS K5407-4-3-1.

MS compatibility: A test tube was charged with 1 g of amino resin varnish, and mineral spirits were dropped at 20° C. The amount of mineral spirits dropped for reaching a turbidity at which a No. 6 type could no longer be read was measured. The higher the MS compatibility, the higher the hydrophobicity of the amino resin.

Production Example 3

Urethane Resin B-1

A 2000 ml four-necked flask equipped with a thermometer, a stirrer, a cooling tube and a nitrogen (air) inlet tube was charged with 40 parts of DMBA, 25 parts of NPG, 15 parts of PPG and 45 parts of toluene. While introducing nitrogen, the mixture was agitated, and the internal temperature thereof was raised to 110° C. to thereby attain dissolution of the contents. Subsequently, while raising the internal temperature to 135° C., the toluene as a solvent was removed. Then, 75 parts of MEK was added, and the internal temperature thereof was lowered to 35° C. When the internal temperature became 35° C., 60 parts of TDI was dropped over a period of 2 hours while maintaining the internal temperature at 55° C. or below. Thus, a urethane resin was obtained.

Production Examples 4 to 10 (Urethane Resins B-2 to -8)

Using the same apparatus as in Production Example 3, urethane resins (B-2 to -8) were produced by changing the types and molar ratios of isocyanate (d), polyol (e) and oxycarboxylic acid (f) having two or more hydroxyl groups.

Production Example 11 (Urethane Resin B-9)

For comparison with an NCO-terminated polyurethane resin, synthesis was carried out using the same apparatus. The apparatus was charged with 100 parts of dimethylolpropionic acid together with hexamethylene diisocyanate and MEK. In nitrogen, the internal temperature was raised to 80° C. and reaction was carried out for 3 hours. Subsequently, the mixture was cooled to 60° C., and a 25% aqueous ammonia solution was incorporated. Reaction was carried on for 1 hour, thereby obtaining a urethane resin.

The thus obtained urethane resins B-1 to -6 are summarized in the following Table 2.

TABLE 2

|   |       | B-1 | B-2 | B-3 | B-4 | B-5 | B-6 | B-7 | B-8 | B-9 |
|---|-------|-----|-----|-----|-----|-----|-----|-----|-----|-----|
| (d) | TDI   | 60  | 60  |     |     | 100 | 60  | 60  | 60  |     |
|     | HDI   |     |     | 60  |     |     |     |     |     | 75  |
|     | NBDI  |     |     |     | 60  |     |     |     |     |     |
| (e) | NPG   | 25  | 25  | 25  | 25  | 25  | 25  | 25  | 25  |     |
|     | PPG-1 | 35  |     | 35  | 35  | 35  |     |     |     |     |
|     | PPG-2 |     |     |     |     |     | 35  |     |     |     |
|     | PCDol |     |     |     |     |     |     | 35  |     |     |
|     | PCLDol|     |     |     |     |     |     |     | 35  |     |
|     | PTG   |     | 35  |     |     |     |     |     |     |     |
| (f) | DMPA  |     |     | 40  |     |     |     |     |     | 40  |
|     | DMBA  | 40  | 40  |     | 40  | 40  | 40  | 40  | 40  |     |
| solvent | MEK | 75 | 75 | 75 | 75 | 75 | 75 | 75 | 75 | 50 |
|     | NH3   |     |     |     |     |     |     |     |     | 11  |

The abbreviations appearing in the table have the following meaning:
TDI: toluylene diisocyanate
HDI: 1,6-hexamethylene diisocyanate
NBDI: norbornene diisocyanate
NPG: neopentyl glycol
PPG-1: polypropylene glycol of 1000 weight average molecular weight
PPG-2: polypropylene glycol of 2000 weight average molecular weight
PCDol: polycarbonate diol of 1000 weight average molecular weight
PCLDol: polycaprolactone diol of 1000 weight average molecular weight
PTG: polytetramethylene ether glycol of 1000 weight average molecular weight
DMPA: 2,2-dimethylolpropionic acid
DMBA: 2,2-dimethylolbutanoic acid
NH3: 25% aqueous ammonia solution
MEK: methyl ethyl ketone Production Examples 12 to 20 (Amino Resin/Urethane Resin Composited Resins R-1 to -9)

A reactor equipped with a thermometer, a stirrer, a reflux condenser and a solvent by-product recovery device was charged with 20 parts of urethane resin B-1 and 100 parts of amino resin A-1 obtained in Production Example 1 together with 30 parts of IPA. The internal temperature thereof was raised to 90° C., and compositing reaction was carried out for 3 hours. Thereafter, 3 parts of N,N-dimethylaminoethanol was added, and the reaction mixture was diluted with 15 parts of water. In vacuum, any excess organic solvent was removed, thereby finally obtaining an amino resin/urethane resin composited resin (R) of Production Example [[9]]12. Using the same reactor, composited resins (R) of Production Examples 13 to 20 were obtained by changing the type of amino resin, type of urethane resin and type of alcohol. The amino resin/urethane resin composited resins (R) obtained in these Production Examples are sequentially referred to as R-1, R-2, R-3, R-4, R-5, R-6, R-7, R-8 and R-9.

The obtained composited resins R-1 to -9 are summarized in the following Table 3.

TABLE 3

|   |   | R-1 | R-2 | R-3 | R-4 | R-5 | R-6 | R-7 | R-8 | R-9 |
|---|---|-----|-----|-----|-----|-----|-----|-----|-----|-----|
| A | A-1 | 100 | 100 | 100 | 100 | 100 |     | 100 | 100 | 100 |
|   | A-2 |     |     |     |     |     | 100 |     |     |     |
|   | A-3 |     |     |     |     |     |     |     |     |     |
| B | B-1 | 20  |     |     |     |     |     | 20  |     |     |
|   | B-2 |     | 20  |     |     |     |     |     |     |     |
|   | B-3 |     |     | 20  |     |     |     |     |     |     |
|   | B-4 |     |     |     | 20  |     |     |     |     |     |
|   | B-5 |     |     |     |     | 20  |     |     |     |     |
|   | B-6 |     |     |     |     |     | 20  |     |     |     |
|   | B-7 |     |     |     |     |     |     |     | 20  |     |
|   | B-8 |     |     |     |     |     |     |     |     | 20  |
| C | isopropyl alcohol | 30 | 30 |   |   |   |   | 30 | 30 | 30 |
|   | 2-butyl alcohol   |    |    | 30 |   |   |   |    |    |    |
|   | tert-butanol      |    |    |    | 30 |   |   |    |    |    |
|   | diacetone alcohol |    |    |    |    | 30 |   |    |    |    |
|   | dimethylethanolamine | 3 | 3 | 3 | 3 | 3 | 3 | 3 | 3 | 3 |
|   | water             | 15 | 15 | 15 | 15 | 15 | 15 | 15 | 15 | 15 |
| properties of water-soluble liq. | appearance | transparent | transParent | transParent | transparent | transparent | transparent | transparent | transparent | transparent |
|   | nonvolatile content (%) | 55 | 56 | 59 | 57 | 56 | 60 | 57 | 61 | 59 |
|   | bubble viscosity | Z | Z1 | Z1Z2 | Z2 | Z3 | Z2 | Z2 | Z1 | Z1Z2 |
|   | pH | 7 | 7.2 | 6.5 | 7.1 | 7.6 | 7.8 | 7.5 | 7.5 | 7.4 |
|   | stability | ○ | ○ | ○ | ○ | ○ | ○ | ○ | ○ | ○ |
|   | water dilutability | ○ | ○ | ○ | ○ | ○ | ○ | ○ | ○ | ○ |

Appearance: judged by visual check.

Nonvolatile content: measured in accordance with JIS K5407-4-3-1.

Bubble viscosity: measured in accordance with JIS K5400-4-5-1.

Stability: judged by appearance exhibited 3 months later at room temperature. ○: no change in separation and transparency x: separation and clouding observed.

Water dilutability: ○: dispersible in any arbitrary proportion of water x: clouding and deposition observed.

Comparative Production Examples 1 to 3

The urethane resin of Production Example 3 was employed in Comparative Production Example 1. The mixture obtained by charging the same apparatus as in Production Examples 12 to 20 with 100 parts of "Cymel 325", 20 parts of urethane resin B-1, 30 parts of diacetone alcohol and 15 parts of water and agitating them at room temperature was employed in Comparative Production Example 2. The mixture obtained by adding 15 parts of water to 100 parts of "Cymel 325" and agitating them was employed in Comparative Production Example 3.

Comparative Production Example 4

The same apparatus as in Production Examples 12 to 20 was charged with 126 parts of melamine, 450 parts of a formaldehyde-isobutanol solution (40% formaldehyde, 50% isobutanol and 10% water) and 219 parts of isobutanol. While stirring, the mixture was slowly heated, and the internal temperature thereof was maintained at 90° C. for 60 min. The obtained isobutanol solution of melamine and formaldehyde was referred to as A-4. Subsequently, 50 parts of urethane resin produced in Production Example 11 was added, and while removing azeotropic water, the internal temperature was raised to 93° C. The reaction was carried on for 5 hours. After the completion of the reaction, a desolventizing operation was carried out in vacuum, and butyl Cellosolve was added so as to regulate the nonvolatile content to 70%. A separately provided apparatus similar to the production apparatus was charged with 100 parts of the resin regulated to 70%. The pH value was adjusted to 7 with the use of triethylamine, and 60 parts of water was dropped at 40° C. over a period of 2 hours. Thus, a milk-white aqueous liquid was obtained. Once more, a vacuum desolventizing operation was carried out so as to attain concentration to a nonvolatile content of 51.0%. This resin was referred to as the resin of Comparative Production Example 4.

Comparative Production Example 5

The same apparatus as in Comparative Production Example 4 was charged with 126 parts of melamine, 130 parts of 92% paraformaldehyde, 20 parts of water and 256 parts of n-butanol. While stirring, the mixture was slowly heated, and the internal temperature thereof was maintained at 90° C. for 60 min. The obtained n-butanol solution of melamine and aldehyde was referred to as A-5. Subsequently, 25 parts of urethane resin produced in Production Example 11 was added, and while removing azeotropic water, the internal temperature was raised to 93° C. The reaction was carried on for 4 hours. After the completion of the reaction, the pH value was adjusted to 7.5 with the use of dimethylethanolamine, and a desolventizing operation was carried out in vacuum. Butyl Cellosolve was added so as to regulate the nonvolatile content to 70%. A separately provided apparatus similar to the production apparatus was charged with 100 parts of the resin regulated to 70%. The pH value was adjusted to 7 with the use of dimethylethanolamine, and 60 parts of water was dropped at 40° C. over a period of 2 hours. Thus, a milk-white aqueous liquid was obtained. Once more, a vacuum desolventizing operation was carried out so as to attain concentration to a nonvolatile content of 51%. This resin was referred to as the resin of Comparative Production Example 5. Table 4 summarizes the results of these Production Examples. The evaluation results with respect to stability are summarized in Table 4.

TABLE 4

|   |   | Comp. Prod. Ex. 1 | Comp. Prod. Ex. 2 | Comp. Prod. Ex. 3 | Comp. Prod. Ex. 4 | Comp. Prod. Ex. 5 |
|---|---|---|---|---|---|---|
| A | A-1 |   |   |   |   |   |
|   | A-2 |   |   |   |   |   |
|   | A-3 |   | 100 | 100 |   |   |
|   | A-4 |   |   |   | 795 |   |
|   | A-5 |   |   |   |   | 532 |
| B | B-1 | 20 | 20 |   |   |   |
|   | B-2 |   |   |   |   |   |
|   | B-3 |   |   |   |   |   |
|   | B-4 |   |   |   |   |   |
|   | B-5 |   |   |   |   |   |
|   | B-9 |   |   |   | 50 | 25 |
| C | isopropyl alcohol |   |   |   |   |   |
|   | 2-butyl alcohol |   |   |   |   |   |
|   | tert-butanol |   |   |   |   |   |
|   | diacetone alcohol |   | 30 |   |   |   |
|   | dimethylethanolamine | 3 | 3 |   |   |   |
|   | triethylamine |   |   |   | 30 | 30 |
|   | water | 15 | 15 | 15 | 60 | 60 |
| properties of water-soluble liq. | appearance | transparent | separated | separated | transparent | milky |
|   | nonvolatile content (%) | 61 | 57 | 80 | 51 | 51 |
|   | bubble viscosity | G | Z1 | Z | JK | Z5Z6 |
|   | pH | 7.0 | 7.4 | 7.1 | 7.2 | 7.5 |
|   | stability | ○ | x | x | ○ | ○ |
|   | water dilutability | ○ | x | x | ○ | ○ |

Appearance: judged by visual check.

Nonvolatile content: measured in accordance with JIS K5407-4-3-1.

Bubble viscosity: measured in accordance with JIS K5400-4-5-1.

Stability: judged by appearance exhibited 3 months later at room temperature. ○: no change in separation and transparency X: separation and clouding observed.

Water dilutability: ○: dispersible in any arbitrary proportion of water X: clouding and deposition observed.

Reference Production Example

A production example for polyester resin being a base resin for use in Examples is as follows. A four-necked flask equipped with a stirrer, a thermometer, a reflux condenser and a nitrogen inlet tube was charged with 270 parts of isophthalic acid, 120 parts of adipic acid, 285 parts of neopentyl glycol and 60 parts of trimethylolpropane. In a nitrogen stream, the mixture was heated to 230° C., and while removing water outside the system, reaction was carried on for about 5 hours. Thus, a polyester resin was obtained. This resin was diluted with ethylene glycol monobutyl ether into a heating residue of 60%, thereby obtaining a polyester resin of 30 resin acid value.

Each of the thus obtained amino resin/urethane composited resins was blended with an aqueous polyester resin and formulated into a paint. The paint was applied by spray onto a steel sheet treated with zinc phosphate with a target coating thickness of 25 μm, and setting was carried out at 60° C. for 30 min. Thereafter, baking was carried out at 140° C. for 30 min. The evaluation results are summarized in Tables 5 and 6.

TABLE 5

|  |  | Example 1 | Example 2 | Example 3 | Example 4 | Example 5 | Example 6 | Example 7 | Example 8 | Example 9 |
|---|---|---|---|---|---|---|---|---|---|---|
| composited resin | R-1 | 25 parts | | | | | | | | |
|  | R-2 | | 25 parts | | | | | | | |
|  | R-3 | | | 25 parts | | | | | | |
|  | R-4 | | | | 25 parts | | | | | |
|  | R-5 | | | | | 25 parts | | | | |
|  | R-6 | | | | | | 25 parts | | | |
|  | R-7 | | | | | | | 25 parts | | |
|  | R-8 | | | | | | | | 25 parts | |
|  | R-9 | | | | | | | | | 25 parts |
| base resin | Ref. Prod. Ex. | 100 parts | 100 parts | 100 parts | 100 parts | 100 parts | 100 parts | 100 parts | 100 parts | 100 parts |
| properties | coating thickness (μm) | 24 | 23 | 26 | 24 | 23 | 23 | 25 | 26 | 23 |
| of | pencil hardness | 2H | 3H | 2H | 3H | 2H | 3H | 2H | 2H | 2H |
| coating | cross-cut adhesion | 100/100 | 100/100 | 100/100 | 100/100 | 100/100 | 100/100 | 100/100 | 100/100 | 100/100 |
|  | Du Pont(cm) | 60 | 35 | 50 | 45 | 50 | 25 | 50 | 50 | 50 |
|  | Erichsen (mm) | 7.0 | 5.8 | 6.8 | 6.5 | 7.0 | 3.5 | 8.0 | 7.8 | 7.3 |
|  | bending | 0T | 1T | 0T | 0T | 0T | 1T | 0T | 0T | 0T |
|  | elongation (%) | 30.2 | 15.0 | 28.9 | 18.9 | 35.0 | 25.9 | 36.1 | 31.1 | 28.8 |
|  | strength (kgf/cm 2) | 252.3 | 595.0 | 280.2 | 502.0 | 230.0 | 291.0 | 273.3 | 261.0 | 284.0 |
|  | water resistance | ○ | ○ | ○ | ○ | ○ | ○ | ○ | ○ | ○ |
|  | salt spray | ○ | ○ | ○ | ○ | ○ | ○ | ○ | ○ | ○ |

Water resistance (60° C./48 Hr)
Salt spray (100 Hr)

TABLE 6

|  |  | Comp. Ex. 1 | Comp. Ex. 2 | Comp. Ex. 3 | Comp. Ex. 4 | Comp. Ex. 5 |
|---|---|---|---|---|---|---|
| composited resin | Comp. Prod. Ex. 1 | 25 parts | | | | |
|  | Comp. Prod. Ex. 2 | | 25 parts | | | |
|  | Comp. Prod. Ex. 3 | | | 25 parts | | |
|  | Comp. Prod. Ex. 4 | | | | 25 parts | |
|  | Comp. Prod. Ex. 5 | | | | | 67 parts |
| base resin | Ref. Prod. Ex. | 100 parts | 100 parts | 100 parts | 100 parts | 100 parts |
| properties | coating thickness (μm) | 23 | evaluation infeasible because of coating mat'l separation | 25 | 22 | 23 |
| of | pencil hardness | B | | 2B | B | H |
| coating | cross-cut adhesion | 20/100 | | 0/100 | 100/100 | 100/100 |
|  | Du Pont(cm) | 35 | | 15 | 25 | 15 |
|  | Erichsen (mm) | 4.5 | | 2.8 | 3.0 | 2.5 |
|  | bending | 2T | | 1T | 2T | 2T |
|  | elongation (%) | 32.9 | | 8.0 | 16.0 | 6.2 |
|  | strength (kgf/cm 2) | 250.4 | | 410.2 | 223.4 | 201.3 |
|  | water resistance (60° C./48 Hr) | X | | X | X | ○ |
|  | salt spray (100 Hr) | x | | x | x | x |

<Testing Method and Judgment Criteria>

Coating thickness: measured by the use of coating thickness tester (LZ200W) manufactured by kett.

Pencil hardness: measured in accordance with JIS K5400-8-4.

Cross-cut adhesion: evaluated by the number of adhering sites after tape detachment in accordance with JIS K5400-8-5-2.

Erichsen: according to JIS K5400-8-2.

Du Pont: measured with the use of a hammer of ½ inch R distal end under a load of 300 g in accordance with JIS K5400-8-3 Du Pont system.

Bending: evaluated by the coating film strength exhibited at the bending of coated sheet. 0T indicates that there is no cracking in the absence of any 0.3 mm thick sheet sandwiched, thereby attesting to the highest bending resistance performance. 1T indicates that there is no cracking in the presence of one 0.3 mm thick sheet sandwiched. 2T indicates the need to sandwich two like sheets, necessitating mild bending conditions.

Water resistance: evaluated by observing the state of clouding exhibited one hour later than takeout upon immersion in 60° C. water for 48 hours. ○: no rust, no blister. X: rust and blister observed.

Elongation and strength: evaluated by detaching a coating film from a substrate and measuring the obtained film by means of INTESCO model 210 with the use of No. 2 dumbbell at a rate of 50 mm/min.

Salt spray: evaluated by a 100 Hr breakdown test in which a 5% salt solution was atomized at 40° C., ○: no filiform rust, no peeling. X: filiform rust and peeling observed.

The invention claimed is:

1. An aqueous thermosetting composition comprising a composited resin (R) obtained by reacting in an alcohol (C), an amino resin (A) with a urethane resin (B) having a hydroxyl group in its terminal structure, and dissolving the composited resin (R) in water completely or partially;

wherein the urethane resin (B) is produced by reacting a polyol (e) and an oxycarhoxylic acid (f) having two or more hydroxyl groups with an isocyanate (d) and regulating the molar ratio of isocyanate groups in the isocyanate (d) to a value of 0.5 to 0.9 based on 1 mol of hydroxyl groups in the polyol (e) and in the oxycarboxylic acid (f); and the amino resin (A) is obtained by addition dehydration condensation of an amino compound (a), an aldehyde (b) and an alcohol (c) having the formula $C_nH_{2n+1}OH$ ($8 \geq n \geq 4$).

2. The aqueous thermosetting composition according to claim 1, characterized by containing a polyol of at least 500 weight average molecular weight as the polyol (e).

3. The aqueous thermosetting composition according to claim 1, wherein the urethane resin (B) has, as its terminal functional groups, hydroxyl groups capable of reacting with an amino resin, at least one of which has reacted with the amino resin (A).

4. A process for producing the aqueous thermosetting composition of claim 1, comprising reacting a polyol (e) and an oxycarboxylic acid (f) having two or more hydroxyl groups with an isocyanate (d) and regulating the molar ratio of isocyanate groups in the isocyanate (d) to a value of 0.5 to 0.9 based on 1 mol of hydroxyl groups in the polyol (e) and in the oxycarboxylic acid (f) to produce a urethane resin (B) having a hydroxyl group in its terminal structure, reacting an amino resin (A) obtained by addition dehydration condensation of an amino compound (a), an aldehyde (b) and an alcohol (c) having the formula $C_nH_{2n+1}OH$ ($8 \geq n \geq 4$) with the urethane resin (B), in an alcohol solvent (C), to produce the composited resin (R) such as reacting at least respective portions of the amino resin (A) and the urethane resin (B) with each other, and dissolving the composited resin (R) in water completely or partially.

5. The process for aqueous thermosetting composition production according to claim 4, wherein an alcohol (C) of the type different from that of the alcohol (c) is used as a reaction solvent.

6. The process for aqueous thermosetting composition production according to claim 4, wherein, after the reaction of at least respective portions of the amino resin (A) and the urethane resin (B), neutralization is carried out with the use of an organic or inorganic basic compound.

7. A paint comprising the aqueous thermosetting composition of claim 1.

8. A coating agent comprising the aqueous thermosetting composition of claim 1.

9. An adhesive comprising the aqueous thermosetting composition of claim 1.

* * * * *